US007583275B2

(12) United States Patent
Neumann et al.

(10) Patent No.: US 7,583,275 B2
(45) Date of Patent: Sep. 1, 2009

(54) MODELING AND VIDEO PROJECTION FOR AUGMENTED VIRTUAL ENVIRONMENTS

(75) Inventors: Ulrich Neumann, Manhattan Beach, CA (US); Suya You, Arcadia, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 10/676,377

(22) Filed: Sep. 30, 2003

(65) Prior Publication Data

US 2004/0105573 A1 Jun. 3, 2004

Related U.S. Application Data

(63) Continuation-in-part of application No. 10/278,349, filed on Oct. 22, 2002, now Pat. No. 7,239,752.

(60) Provisional application No. 60/418,841, filed on Oct. 15, 2002.

(51) Int. Cl.
*G09G 5/02* (2006.01)
*G09G 5/14* (2006.01)

(52) U.S. Cl. ..................... 345/633; 345/419; 345/473; 345/427; 382/284; 382/154; 703/2

(58) Field of Classification Search ......... 345/629–641, 345/664, 665, 619, 419, 473, 427; 382/284, 382/154; 703/2
See application file for complete search history.

(56) References Cited

U.S. PATENT DOCUMENTS

| 5,310,794 | A | * | 5/1994 | DeNicola et al. ............... 525/71 |
| 5,850,352 | A | * | 12/1998 | Moezzi et al. ............... 345/419 |
| 6,078,701 | A | | 6/2000 | Hsu et al. |
| 6,084,979 | A | * | 7/2000 | Kanade et al. ............... 382/154 |

(Continued)

FOREIGN PATENT DOCUMENTS

GB  2340330 A  *  2/2000

(Continued)

OTHER PUBLICATIONS

Haala, N., C. Brenner. "Generation of 3D city models from airborne laser scanning data" the 3rd EARSEL workshop on LIDAR Remote Sensing on Land and Sea, Tallinn, 105-112, 1997.*

(Continued)

*Primary Examiner*—Javid A Amini
(74) *Attorney, Agent, or Firm*—Fish & Richardson P.C.

(57) ABSTRACT

Systems and techniques to implement augmented virtual environments. In one implementation, the technique includes: generating a three dimensional (3D) model of an environment from range sensor information representing a height field for the environment, tracking orientation information of image sensors in the environment with respect to the 3D model in real-time, projecting real-time video from the image sensors onto the 3D model based on the tracked orientation information, and visualizing the 3D model with the projected real-time video. Generating the 3D model can involve parametric fitting of geometric primitives to the range sensor information. The technique can also include: identifying in real time a region in motion with respect to a background image in real-time video, the background image being a single distribution background dynamically modeled from a time average of the real-time video, and placing a surface that corresponds to the moving region in the 3D model.

15 Claims, 8 Drawing Sheets

U.S. PATENT DOCUMENTS

| | | | | |
|---|---|---|---|---|
| 6,124,864 | A | * | 9/2000 | Madden et al. ............. 345/473 |
| 6,144,375 | A | * | 11/2000 | Jain et al. ................. 715/500.1 |
| 6,181,343 | B1 | * | 1/2001 | Lyons ......................... 715/850 |
| 6,253,164 | B1 | * | 6/2001 | Rohm et al. .................... 703/2 |
| 6,269,175 | B1 | | 7/2001 | Hanna et al. |
| 6,400,364 | B1 | * | 6/2002 | Akisada et al. ............. 345/427 |
| 6,402,615 | B1 | * | 6/2002 | Takeuchi ..................... 463/31 |
| 6,430,304 | B2 | | 8/2002 | Hanna et al. |
| 6,478,680 | B1 | * | 11/2002 | Yoshioka et al. ............. 463/43 |
| 6,490,364 | B2 | | 12/2002 | Hanna et al. |
| 6,512,857 | B1 | | 1/2003 | Hsu et al. |
| 6,522,787 | B1 | | 2/2003 | Kumar et al. |
| 6,571,024 | B1 | | 5/2003 | Sawhney et al. |
| 6,597,818 | B2 | | 7/2003 | Kumar et al. |
| 6,608,549 | B2 | * | 8/2003 | Mynatt et al. ................ 340/5.8 |
| 6,618,058 | B1 | * | 9/2003 | Yasui ......................... 715/723 |
| 6,677,942 | B1 | * | 1/2004 | Rushmeier et al. .......... 345/420 |
| 6,686,921 | B1 | * | 2/2004 | Rushmeier et al. .......... 345/589 |
| 6,715,050 | B2 | * | 3/2004 | Williams et al. ............ 711/164 |
| 6,744,442 | B1 | * | 6/2004 | Chan et al. ................. 345/587 |
| 6,750,873 | B1 | * | 6/2004 | Bernardini et al. .......... 345/582 |
| 6,760,488 | B1 | * | 7/2004 | Moura et al. ................ 382/285 |
| 6,765,569 | B2 | * | 7/2004 | Neumann et al. ........... 345/419 |
| 6,879,946 | B2 | * | 4/2005 | Rong et al. ..................... 703/2 |
| 6,914,599 | B1 | * | 7/2005 | Rowe et al. ................. 345/420 |
| 6,917,702 | B2 | * | 7/2005 | Beardsley ................... 382/154 |
| 6,999,073 | B1 | * | 2/2006 | Zwern et al. ................ 345/420 |
| 7,027,046 | B2 | * | 4/2006 | Zhang ........................ 345/419 |
| 7,034,841 | B1 | * | 4/2006 | Weiblen et al. ............. 345/582 |
| 7,057,612 | B2 | * | 6/2006 | Balfour ...................... 345/419 |
| 7,062,722 | B1 | * | 6/2006 | Carlin et al. ................. 715/850 |
| 2001/0005425 | A1 | * | 6/2001 | Watanabe et al. ........... 382/154 |
| 2001/0019621 | A1 | | 9/2001 | Hanna et al. |
| 2001/0036307 | A1 | | 11/2001 | Hanna et al. |
| 2001/0038718 | A1 | * | 11/2001 | Kumar et al. ............... 382/284 |
| 2001/0043738 | A1 | | 11/2001 | Sawhney et al. |
| 2002/0060784 | A1 | | 5/2002 | Pack |
| 2002/0061131 | A1 | | 5/2002 | Sawhney et al. |
| 2002/0093538 | A1 | * | 7/2002 | Carlin ......................... 345/778 |
| 2002/0095276 | A1 | * | 7/2002 | Rong et al. ..................... 703/2 |
| 2002/0113756 | A1 | * | 8/2002 | Tuceryan et al. ............... 345/8 |
| 2002/0118874 | A1 | * | 8/2002 | Chung et al. ................ 382/154 |
| 2002/0147729 | A1 | * | 10/2002 | Balfour ................... 707/104.1 |
| 2002/0149470 | A1 | * | 10/2002 | Mynatt et al. .............. 340/10.1 |
| 2002/0191862 | A1 | * | 12/2002 | Neumann et al. ........... 382/284 |
| 2003/0014224 | A1 | | 1/2003 | Guo et al. |
| 2003/0025788 | A1 | * | 2/2003 | Beardsley ..................... 348/43 |
| 2003/0038798 | A1 | * | 2/2003 | Besl et al. ................... 345/420 |
| 2003/0080978 | A1 | | 5/2003 | Navab et al. |
| 2003/0085992 | A1 | * | 5/2003 | Arpa et al. ..................... 348/47 |
| 2003/0147553 | A1 | * | 8/2003 | Chen et al. ................... 382/154 |
| 2003/0179218 | A1 | * | 9/2003 | Martins et al. .............. 345/633 |
| 2003/0202691 | A1 | * | 10/2003 | Beardsley ................... 382/154 |
| 2004/0046736 | A1 | * | 3/2004 | Pryor et al. ................. 345/156 |
| 2004/0113887 | A1 | * | 6/2004 | Pair et al. .................... 345/156 |
| 2004/0135788 | A1 | * | 7/2004 | Davidson et al. ............ 345/530 |

OTHER PUBLICATIONS

You, S. and Ulrich Neumann. "Automatic Object Modeling for 3D Virtual Environment". Proceddings of NMBIA, pp. 21-26, 1998.*
Weinhaus, F. and V. Devarajan. "Texture Mapping 3D Models of Real-World Scenes."*
Frederick Weinhaus and Venkat Devarajan with title of "Texture Mapping 3D Models of Real-World Scenes" ACM vol. 29, No. 4 1997 pp. 325-363.*
Modeling and rendering architecture from photographs: a hybrid geometry- and image-based approach Paul E. Debevec, Camillo J. Taylor, Jitendra Malik Aug. 1996.*
Online model reconstruction for interactive virtual environments Benjamin Lok Mar. 2001 Proceedings of the 2001 symposium on Interactive 3D graphics SI3D '01 Publisher: ACM Press.*
Dynamic model and light-field capture: Spatio-temporal view interpolation Sundar Vedula, Simon Baker, Takeo Kanade Jul. 2002 Proceedings of the 13th Eurographics workshop on Rendering EGRW '02 Publisher: Eurographics Association.*
Using mobile code to create ubiquitous augmented reality Kari J. Kangas, Juha Röning Mar. 2002 Wireless Networks, vol. 8 Issue 2/3 Publisher: Kluwer Academic Publishers.*
Modeling acoustics in virtual environments using the uniform theory of diffraction Nicolas Tsingos, Thomas Funkhouser, Addy Ngan, Ingrid Carlbom Aug. 2001 Proceedings of the 28th annual conference on Computer graphics and interactive techniques SIGGRAPH '01.*
Bolan Jiang et al., "A Robust Hybrid Tracking System for Outdoor Augmented Reality", Integrated Media Systems Center, University of Southern California.
Joseph R. Spann et al., "Photogrammetry Using 3D Graphics and Projective Textures", IAPRS, vol. XXXIII, Amsterdam, 2000.
Brett Hall et al., "A Novel Graphical Interface and Context Aware Map for Incident Detection and Monitoring", 9th World Congress on Intelligent Transport Systems, Oct. 2002.
Ulrich Neumann et al., "Visualizing Reality in an Augmented Virtual Environment", Integrated Media Systems Center, University of Southern California.
R. Azuma, "A Survey of Augmented Reality", Presence: Teleoperators and Virtual Environments. vol. 6, No. 4, pp. 355-385, 1997.
P.E. Debevec, C.J. Taylor and J. Malik, "Modeling and Rendering Architecture from Photograph: A Hybrid Geometry-and-Image-based Approach", SIGGRAPH' 96, pp. 11-20, 1996.
E. Foxlin. "Inertial Head-Tracker Sensor Fusion by a Complementary Separate-Bias Kalman Filter", IEEE Virtual Reality Annual International Symposium, pp. 184-194, 1996.
C. Fruh and A. Zakhor, "3D Model Generation for Cites Using Aerial Photographs and Ground Level Laser Scans", IEEE Conference on Computer Vision and Pattern Recognition, 2001.
R.C. Gonzales, R.E. Woods, Digital Image Processing. Addison-Wesley, $2^{nd}$ edition (Sep. 1993), pp. 41-44.
N. Greene, M. Kass, and G. Miller, Hierarchical Z-Buffer Visibility. SIGGRAPH' 93, pp. 231-238, 1993.
A. Gruen and R. Nevatia (editors), "Special Issue on Automatic Building Extraction from Aerial Images", Computer Vision and Image Understanding, Nov. 1998.
P. Haeberli and M. Segal, "Texture mapping as a fundamental drawing primitive", in M. F. Cohen, C. Puech, and F. Sillion, editors, Fourth Eurographics Workshop on Rendering, pp. 259-266, 1993.
M. Harville, G. Gordon, and J. Woodfill, "Foreground Segmentation using Adaptive Mixture Models in Color and Depth", Proceedings of the IEEE Workshop on Detection and Recognition of Events in Video, Jul. 2001.
W. Heidrich and H.P. Seidel, "Realistic, Hardware-accellerated Shading and Lighting", SIGGRAPH' 99, 1999.
Y. Hsieh, "SiteCity: A semi-automated Site Modeling System", IEEE Conference on Computer Vision and Pattern Recognition, pp. 499-506, 1996.
R. Jain, R. Kasturi, B.G. Schunck, Machine Vision, McGraw-Hill International Edition, 1995, pp. 76.
B. Jiang, U. Neumann, "Extendible Tracking by Line Auto-Calibration," International Symposium on Augmented Reality, pp. 97-103, New York, Oct. 2001.
T. Kanade, R. Collins, A. Lipton, P. Burt and L. Wixson, "Advances in cooperative multi-sensor video surveillance", Proc. OfDARPA Image Understanding Workshop, vol. 1 pp. 3-24, 1998.
T. Kanade, P. Rander, S. Vedula, and H. Saito, Mixed Reality, Merging Real and Virtual Worlds, Yuichi Ohta, Hideyuki Tamura, ed., Springer-Verlag, 1999, pp. 41-57.
W. Koller and J. Malik, "Robust multiple car tracking with occlusion reasoning" In Proc. Third European Conference on Computer Vision, May 2-6, pp. 189-196, 1994.
R. Kumar, H.S. Sawhney, Y. Guo, S. Hsu, and S. Samarasekera, "3D Manipulation of Motion Imagery" Proceeedings of International Conference on Image Processing (ICIP'2000), Vancouver, Canada, Sep. 2000.

S. C. Lee, S. K. Jung, and R. Nevatia, "Automatic Integration of Façade Textures into 3D Building Models with Projective Geometry Based Line Clustering", EUROGRAPHIC'02, 2002.

U. Neumann and S. You, "Augmented Virtual Environments (AVE): for Visualization of Dynamic Imagery", IEEE Virtual Reality'03, pp. 61-67. Los Angeles, CA, Mar. 2003.

U. Neumann and S. You, "Natural Feature Tracking for Augmented-Reality", IEEE Transactions on Multimedia. vol. 1, No. 1, pp. 53-64, Mar. 1999.

W. Reeves, D. Salesin and R. Cook, "Rendering Antialiased Shadows with Depth Maps", Computer Graphics, vol. 21, No. 4, Jul. 1987.

R. Remagnino, A. Baumberg, T. Grove, D. Hogg, T. Tan, A. Worrall, and K. Baker, "An integrated traffic and pedestrian model-based vision System". Proceedings of BMVC97, vol. 2, pp. 380-389, 8, Sep. 1997.

W. Ribarsky, T. Wasilewski, and N. Faust, "From Urban Terrain Models to Visible Cities", IEEE Computer Graphics & Applications, vol. 22, No. 4, 2002.

C. Ridder, O. Munklet, and H. Kirchner, "Adaptive background estimation and foreground detection using Kalman-filtering". ICRAM'95, pp. 193-199, 1995.

M. Segal, C. Korobkin, R. Van Widenfelt, J. Foran, and P. Haeberli, "Fast shadows and lighting effects using texture mapping", SIGGRAPH '92, pp. 249-252, 1992.

J. R. Spann and K. S. Kaufman, "Photogrammetry using 3D graphics and projective textures", IAPRS 2000, vol. 33.

C. Stauffer, W.E.L. Grimson, "Adaptive background mixture models for real-time tracking" CVPR 99, vol. 2, pp. 246-252, Jun. 1999.

H. Tao, H. S. Sawheny, R. Kumar, "Dymanic layer representation with applications to tracking", Proc. IEEE conf. on Computer Vision and Pattern Recognition, CVPR 2000, vol. 2, pp. 134-141, Jun. 2000.

S. J. Teller and C. H. Seouin, "Visibility preprocessing for interactive walkthroughs", SIGGRAPH '91, pp. 61-69, 1991.

S. You, J. Hu, U. Neumann, and P. Fox, "Urban Site Modeling From LiDAR", Second International Workshop on Computer Graphics and Geometric Modeling CGGM'2002, pp. 579-588, Montreal, Canada, 2002.

S. You, U. Neumann, and R. Azuma, "Orientation Tracking for Outdoor Augmented Reality Registration", IEEE Computer Graphics & Applications, vol. 19, No. 6, pp. 36-42, Nov. 1999.

Z. Zhang, "A flexible new technique for camera calibration", IEEE Transactions on Pattern Analysis and Machine Intelligence, vol. 22, No. 11, pp. 1330-1334, 2000.

Ulrich Neumann et al., "Augmented Virtual Environments (AVE): Dynamic Fusion of Imagery and 3D Models", Integrated Media Systems Center, University of Southern California.

P. E. Debevec, Y. Yu and G. D. Borshukov, "Efficient View-Dependent Image-Based Rendering with Projective Texture-Mapping", $9^{th}$ Eurographics Workshop on Rendering, pp. 105-116, 1998.

D. Liebowitz, A. Criminisi and A. Zisserman, "Creating Architectural Modeling From Images", EUROGRAPHIC'99, pp. 39-50, 1999.

Foley, J. D., Van Dam, A., Feiner, S. K. and Hughes, J. F., "Computer Graphics: principles and practice", Addison-Wesley, Reading. Massachusetts, 1990.

M. J. Zyda and D. R. Pratt, "NPSNET: A Multilayer 3D Virtual Environment Over the Internet", Proceedins of the ACM- 1995 Symposium on Interactive 3D Graphics, Apr. 9-12, 1995, Monterey, California.

Cruz-Neira, C., Sandin, D. J. and DeFanti, T. A., "Surround-Screen Projection-Based Virtual Reality: The Design and Implementation of the CAVE" SIGGRAPH'93, 1993.

B. Curless, and M. Levoy, "A volumetric method for building complex models from range images", SIGGRAPH'96, pp. 303-312, 1996.

Mark, W. R., Mcmillan, L. and Bishop, G. Post-rendering 3D warping. ACM Symposium on Interactive 3D Graphics, pp. 7-16, 1997.

Zhao, B. and Trinder, J., "Integrated Approach Based Automatic Building Extraction", $19^{th}$ ISPRS Congress, Book 3B, pp. 1026-1032, Amsterdam.

Seresht, M. And Azizi, A., "Automatic Building Recognition from Digital Aerial Images", $19^{th}$ ISPRS Congress, Book 3B, pp. 792-798, Amsterdam.

Coorg, S. and S. Teller, "Extracting Textured Vertical Facades from Controlled Close-Range Imagery", CVPR, 1999, pp. 625-632.

A. Elasksher, J. Bethel, "Building Extraction Using Lidar Data", ASORS-ACSM Annual Conference and FIG XXII Congress, Apr. 22-26, 2002.

Haala, N., C. Brenner, "Generation of 3D city models from airborne laser scanning data", the $3^{rd}$ EARSEL Workshop on LIDAR Remote Sensing on Land and Sea, Tallinn, 105-112, 1997.

Suya Y., Ulrich N., Automatic Object Modeling for 3D virtual Environment, Proceedings of NMBIA, pp. 21-26, 1998.

William, H., Saul, A., William, T., and Brian, P., "Numerical Recipes in C", Cambridge University Press, 1992.

http://www.cybercity.tv.

A. Brogni et al., "Technological Approach for Cultural Heritage: Augmented Reality", Proceedings of the 1999 IEEE, International Workshop on Robot and Human Interaction, Sep. 1999.

P.D. Crouser et al., "Unattenuated tracer particle extraction through time-averaged, background image subtraction with outlier rejection", Experiments in Fluids 22 (1997)- XP-000727469.

Carla Nardinocchi et al., "Building extraction from LIDAR data", IEEE/ISPRS Joint Workshop on Remote Sensing and Data Fusion over Urban Areas, 2001, XP-002271137.

"Fast shows and lighting effects using texture mapping" Mark Segal et al., Computer Graphics (SIGGRAPH ' 92 proceedings), pp. 249-252, Jul. 1992.

"Merging virtual objects with the real world seeing ultrasound imagery within the patient", Bajura et al., ACM SIGGRAPH Computer Graphics, 1992.

"Modeling and rendering architecture for photographs: a hybrid geometry-and image-based approach", Paul E. Debevec et al., Proceedings of the $23^{rd}$ annual conference on Computer graphics and interactive techniques, Aug. 1996.

"Technologies for augmented reality systems: realizing ultrasound-guided needle biopsies", Andrei State et al., Proceedings of the $23^{rd}$ annual conference on Computer graphics and interactive techniques, Aug. 1996.

"MURI project—Rapid and affordable generation on terrain and detailed urban feature data", Purdue Leading URL http://www.ecn.purdue.edu/MURI/, Sep. 1996-Sep. 2001.

"MURI project—Rapid and affordable generation of terrain and detailed urban feature data", http://www.ecn.purdue.edu/MURI/present.html , Sep. 1996-Sep. 2001.

"VSAM IFD Web Presentation", http://www-2.cs.cmu.edu/~vsam/Web2000/index.html , 1997-1999.

"Cooperative Multi-Sensor Video Surveillance", Kanade et al., DARPA Image Understanding Workshop (IUW), New Orleans, LA, pp. 3-10, May 1997.

"Texture mapping 3D models of real-world scenes", Frederick M. Weinhaus et al., ACM Computing Surveys (CSUR), vol. 29, Issue 4, Dec. 1997.

"Silicon Graphics Witches Brew UAV", Angus Dorbie, Silicon Graphics, Inc., http://www.sgi.com/products/software/performer/brew/pdfs/uav.pdf , 1997.

"Windows on the World: An example of Augmented Virtuality", Kristian T. Simsarian et al., Interfaces: Man-Machine Interaction, Montpellier 1997.

"Using live video to represent remote users in collaborative virual environment" Fang Wang, Technical Report, Electronic Visualization Laboratories, The University of Illinois at Chicago, (URL http://www.evl.uic.edu/fwang/video.html), Apr. 10, 1998.

"Augmented Virtuality: A method to automatically augment virutal worlds with video images"—MS Thesis, Karl-Petter Akesson et al., (URL:http://www.sics.se/~kalle/projects/Master_Thesis/index.html), Apr. 20, 1998.

"The office of the future: a unified approach to image-based modeling and spatially immersive displays", Ramesh Raskar et al., Proceedings of the $25^{th}$ annual conference on Computer graphics and interactive techniques, Jul. 1998.

"Understanding and constructing shared spaces with mixed-reality boundaries", Steve Benford et al., ACM Transactions on Computer-Human Interaction (TOCHI) vol. 5, Issue 3, Sep. 1998.

"Image-based object representation by layered imposters", Schaufler Gernot, Proceedings of the ACM symposium on Virtual reality software and technology, Nov. 1998.

"SGI Open Performer White Paper- UAV", http://www.sgi.com/products/software/performer/whitepapers.html , Nov. 10, 1998.

"Advances in Cooperative Multi-Sensor Video Surveillance", Kanade et al., DARPA Image Understanding Workshop (IUW), Monterey, CA, pp. 3-24, Nov. 1998.

"A System for Video Surveillance and Monitoring", Collins et al., Proceedings of American Nuclear Society (ANS) eighth international topical meeting on robotics and remote systems, Pittsburgh, PA, Apr. 25-29, 1999.

"Augmented Reality in Multi-camera Surveillance", Sequeira et al., Proceedings of the 21$^{st}$ ESARDA symposium on safeguards and nuclear material management, pp. 661-666, Sevilla, Spain, May 4-6, 1999.

"Virtual Postman-Real-Time, Interactive Virtual Video", Alan J. Lipton, IASTED CGIM '99, Oct. 1999.

"Automatic modeling of a 3D city map from real-world video", Hiroshi Kawasaki et al., Proceedings of the seventh ACM international conference on Multimedia (Part 1), Oct. 1999.

"Immersive teleconferencing: a new algorithm to generate seamless panoramic video imagery", Aditi Majumder et al., Proceedings of the seventh ACM international conference on Multimedia (Part 1), Oct. 1999.

"Reality Portals", Karl-Petter Akesson et al., Proceedings of the ACM symposium on Virtual reality software and technology, Dec. 1999.

"A video-based virtual reality system", Haruo Takeda et al., Proceedings of the ACM symposium on Virtual reality software and technology, Dec. 1999.

"Multi-layered imposters for accelerated rendering", Xavier Decoret et al., EUROGRAPHICS '99, P. Burunet and R. Scopigno, vol. 18, No. 3, 1999.

"Video textures", Arno Sch et al., Siggraph Proceedings of the 27$^{th}$ annual conference on Computer graphics and interactive techniques 2000.

"Toward human-robot collaboration" Kristian T. Simsarian PhD Thesis, Computational Vision on Active Perception Lab (CVAP) Swedish Institute of Computer Science (SICS) http://media.lib.kth.se/dissengrefhit.asp?dissnr=2941 , Mar. 2000.

"Traversable interfaces between real and virtual worlds" Boriana Koleva et al., Proceedings of the SIGCHI conference on Human factors in computing systems, Apr. 2000.

"A system for video surveillance and monitoring: VSAM final report", Collins et al., Technical report CMU-RI-00-12, Robotics Institute, Carnegie Mellon University, May 2000.

"Presentations from May 10, 2000 Review at BAE San Diego", BAE Systems, Visualization Research (js1.pdf) Capabilities of the VESPER System.

"Photgrammetry using 3D graphics and projective Textures", J. Spann et al., 19$^{th}$ ISPRS Congress, Amsterdam, Jul. 2000.

"Relief texture mapping", Manuel M. Oliveira et al., Proceedings of the 27$^{th}$ annual conference on Computer graphics and interactive techniques, Jul. 2000.

"A video-based rendering acceleration algorithm for interactive walkthroughs", Andrew Wilson et al., Proceedings of the eight ACM international conference on Multimedia, Oct. 2000.

"Rapid modeling of animated faces from video images", Zicheng Liu et al., Proceedings of the eighth ACM international conference on Multimedia, Oct. 2000.

Video Surveillance and Monitoring Homepage—CMU leading URL http://www-2.cs.cmu.edu/~vsam/vsamhome.html , Carnegie Mellon University, Robotics Institute, 2000.

"Adaptive unwrapping for interactive texture painting", Takeo Igarashi et al., Proceedings of the 2001 symposium on Interactive 3D graphics, Mar. 2001.

"Online model reconstruction for interactive virtual environments", Benjamin Lok, Proceedings of the 2001 symposium of Interactive 3D graphics, Mar. 2001.

"Exploiting Video: Spatially-encoded far-field representations for interactive walkthroughs", Andrew Wilson et al., Proceedings of the nineth ACM international conference on Multimedia, Oct. 2001.

"Rapid and affordable generation of terrain and detailed urban feature data", Edward M. Mikhail, Sixth interim progress report Final report, http://www.ecn.purdue.edu/muri/6_rep_all.pdf , Mar. 2002.

Vedula, S., et al., "Modeling, Combining, and Rendering Dynamic Real-World Events from Image Sequences." *Proceedings of 4$^{th}$ Conf. Virtual Systems and MultiMedia*, vol. 1. pp. 326-332, 1998.

Ulrich Neumann, Ph.D., Letter to Alice C. Wong, USPTO re U.S. Appl. No. 10/202,546 and related references, Nov. 3, 2006, to be published by the USPTO.

Sawhney, H. E., et al., *Association for Computing Machinery: "Video Flashlights—Real Time Rendering of Multiple Videos for Immersive Model Visualization"* Rendering Techniques 2002. Eurographics Workshop Proceedings. Pisa, Italy, Jun. 26-28, 2002, Proceedings of the Eurographics Workshop, New York, NY: ACM, US, vol. Workshop 13, Jun. 26, 2002, pp. 157-168, XP001232389.

Database Inspec (Online) The Institution of Electrical Engineers, Stevenage, GB; 1997, Tanaka H T et al., "*Live Facial Expression Generation Based on Mixed Realty*" XP002432320 Database accession No. 5829636.

Kulak, E., European Search Report for Application No. 06076317.4-1522, May 18, 2007, to be published by USPTO.

Lee et al., "Automatic Integration of Façade Textures into 3D Building Models with a Projective Geometry Based Line Clustering", Eurographics 2002, pp. 511-519.

Nardinocchi et al., "Building extraction from LIDAR data", ieee/isprs Jonit Workshop on Remote Sensing and Data Fusion over Urban Areas, 2001, pp. 79-83.

* cited by examiner

MODELING AND VIDEO PROJECTION FOR AUGMENTED VIRTUAL ENVIRONMENTS

CROSS REFERENCE TO RELATED APPLICATIONS

This application claims the benefit of the priority of U.S. Provisional Application Ser. No. 60/418,841, filed Oct. 15, 2002 and entitled "AUGMENTED VIRTUAL ENVIRONMENTS (AVE) FOR VISUALIZATION AND FUSION OF DYNAMIC IMAGERY AND 3D MODELS", and is a continuation-in-part of and claims the benefit of priority of U.S. patent application Ser. No. 10/278,349, filed Oct. 22, 2002 now U.S. Pat. No. 7,239,752, and entitled "EXTENDABLE TRACKING BY LINE AUTO-CALIBRATION".

STATEMENT AS TO FEDERALLY SPONSORED RESEARCH

The invention described herein was made in the performance of work under NSF ERC EEC-9529152 SA2921 by NSF (National Science Foundation) ARO-MURI (Army Research Office—Multidisciplinary University Research Initiative), pursuant to which the Government has certain rights to the invention, and is subject to the provisions of Public Law 96-517 (35 U.S.C. 202) in which the contractor has elected to retain title.

BACKGROUND

The present application describes systems and techniques relating to virtual environments, for example, augmented virtual environments.

Various sensing and modeling technologies offer methods for virtual environment creation and visualization. Conventional modeling systems allow programmers to generate geometric models through the manual manipulation of standard geometric primitives, libraries of pre-modeled objects, or digitizing of key points. In addition, various techniques for acquiring real world data of large environments for use in manually creating scene models have been used. Texture mapping onto the created models has also been supported, including texture mapping of static imagery onto geometric models to produce photorealistic visualizations, typically using static textures derived from fixed cameras at known or computed transformations relative to the modeled objects.

SUMMARY

The present disclosure includes systems and techniques relating to augmented virtual environments, which can be implemented using a machine-readable storage device embodying information indicative of instructions for causing one or more machines to perform operations as described. According to an aspect, a three dimensional model of an environment can be generated from range sensor information representing a height field for the environment. Position and orientation information of at least one image sensor in the environment can be tracked with respect to the three dimensional model in real-time. Real-time video imagery information from the at least one image sensor can be projected onto the three dimensional model based on the tracked position and orientation information, and the three dimensional model can be visualized with the projected real-time video imagery. Additionally, generating the three dimensional model can involve parametric fitting of geometric primitives to the range sensor information.

According to another aspect, a three dimensional model of an environment can be obtained. A region in motion with respect to a background image in real-time video imagery information from at least one image sensor can be identified in real time, the background image being a single distribution background dynamically modeled from a time average of the real-time video imagery information. A surface that corresponds to the moving region can be placed in the three dimensional model. The real-time video imagery information can be projected onto the three dimensional model, including the surface, based on position and orientation information of the sensor, and the three dimensional model can be visualized with the projected real-time video imagery.

Additionally, placing the surface can involve casting a ray from an optical center, corresponding to the real-time video imagery information, to a bottom point of the moving region in an image plane in the three dimensional model, and determining a position, an orientation and a size of the two dimensional surface based on the ray, a ground plane in the three dimensional model, and the moving region. Identifying the region in motion in real time can involve subtracting the background image from the real-time video imagery information, identifying a foreground object in the subtracted real-time video imagery information, validating the foreground object by correlation matching between identified objects in neighboring image frames, and outputting the validated foreground object.

DRAWING DESCRIPTIONS

Details of one or more embodiments are set forth in the accompanying drawings and the description below. Other features and advantages may be apparent from the description and drawings, and from the claims.

DETAILED DESCRIPTION

Figure 1:
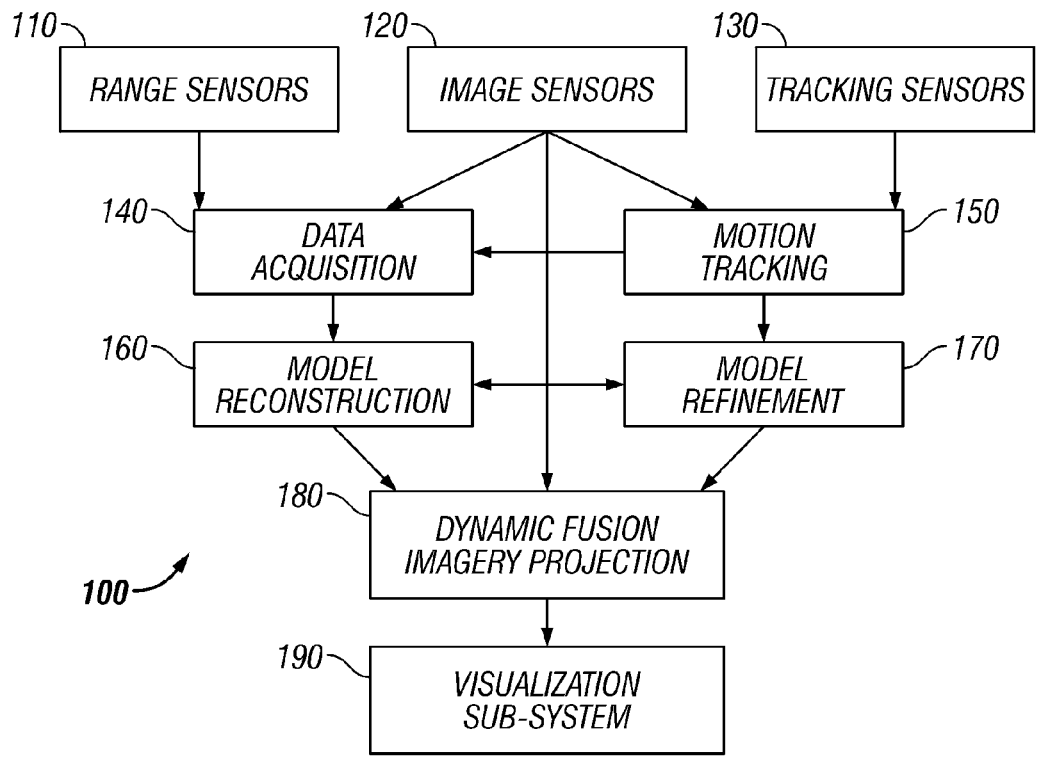
FIG. 1 is a block diagram illustrating an augmented virtual environment system.

FIG. 1 is a block diagram illustrating an augmented virtual environment system 100. The system 100 can include range sensors 110, image sensors 120, and tracking sensors 130. These sensors 110, 120, and 130 can feed information to various components of the system 100, including a data acquisition component 140 and a motion tracking component 150.

The data acquisition component 140 can supply information to a model reconstruction component 160, and the motion tracking component 150 can supply information to a model refinement component 170. The model reconstruction component 160 and the model refinement component 170 can interact with each other to improve the three-dimensional (3D) model continuously during generation of the augmented virtual environment. The image sensors 120 and the model reconstruction and refinement components 160, 170 can feed a dynamic fusion imagery projection component 180, which can supply augmented virtual environment information to a visualization sub-system 190 to create the augmented virtual environment.

The system 100 can generate rapid and reliable realistic three-dimensional virtual environment models, which can be used in many different virtual environment applications, including in engineering, mission planning, training simulations, entertainment, tactical planning, and military operations in battlefield environments. Real-time texture images can be obtained using the image sensors 120 and mapped onto a created 3D model, providing a dynamic and up-to-date picture of the modeled environment. This can be of particular value in time-critical applications, such as military command and control, person or vehicle tracking, and catastrophe management. The system 100 can provide a rapid and accurate fusion of dynamic appearance and geometric data using real-time video and other sensor data.

The augmented virtual environment (AVE) system 100 can capture, represent, and visualize dynamic spatio-temporal events and changes within a real environment. The AVE system 100 can provide virtual-reality augmented by the fusion of dynamic imagery onto a 3D model using integrated systems and techniques, including model reconstruction, model refinement, building extraction, sensor tracking, real-time video/image acquisition, and dynamic texture projection for 3D visualization, as described further below. The AVE system 100 can rapidly create realistic geometric models and dynamically refine and update these models based on multiple sensor sources using the described techniques, allowing both the geometric information and the appearance of the virtual environments to be accurate and realistic analogues of the real world. Multiple streams of dynamic video imagery can be fused on the 3D model substrate to provide a coherent data visualization that enhances scene comprehension, object tracking, and event detection. This can assist users viewing imagery in the AVE system to comprehend and interpret a large number of concurrent image streams from multiple cameras moving within a scene.

The range sensors 110 can include one or more active airborne laser sensors to quickly collect 3D geometric samples of an environment, and initial model acquisition can be performed using the information from these laser sensor(s). Raw data samples can be processed into a consistent 3D geometric mesh model of an environment. For example, a LiDAR (light Detection and Ranging) sensor system can be used in an aircraft flyover to quickly collect a height field for a large environment. The collected data can have an accuracy of centimeters in height and sub-meter in ground position, and higher accuracies can be obtained with newer laser sensor systems. Multiple aircraft passes can be merged to ensure good coverage, and the end result can be a cloud of 3D point samples.

The points can be projected and resampled onto a regular grid, which can be at a user-defined resolution, to produce a height field suitable for hole-filling and tessellation. The model reconstruction phase can automatically process the 3D point cloud and output the reconstructed 3D mesh model in VRML (Virtual Reality Modeling Language) format. In the system 100, the data acquisition component 140 can collect real time geometry and imagery measurements, and the model reconstruction component 160 can obtain a single 3D surface model from the sets of acquired geometric measurements.

The motion tracking component 150 can provide image sensor pose and motion data for registration and data fusion. This sensor tracking can facilitate the proper functioning of the system 100 as geometry and imagery are gathered by different sensor platforms. The tracked platform positions and orientations should be known for the sensor data from the multiple image sensors 120 to be properly projected into a common scene model. This can be effectively accomplished by combining a differential GPS (Global Positioning System) receiver with an off-the-shelf orientation sensor to produce a self-contained portable tracking system coupled to a video camera.

The six DOF (degrees of freedom) pose of a camera can be tracked by the sensors in real-time as the system moves in an open outdoor environment. The tracking data can be encoded and stored with the camera video stream in real-time, and this data can be transmitted to other parts of the system 100 for further processing and also saved on a local storage device (e.g., a hard drive on a laptop computer). The complete tracking, camera, transmission and recording system can be housed in a backpack for mobility, as described below in connection with FIG. 2.

The model refinement component 170 can verify and refine the reconstructed model and extract dominant scene features. An auto-calibration method can automatically estimate the 3D parameters of point and line structures and camera pose simultaneously. Lines and points are typically dominant features of man-made structures, and these features can be used to aid in improving the accuracy and stability of the camera pose estimate obtained from the tracking system. Additional details regarding these auto-calibration systems and techniques can be found in U.S. patent application Ser. No. 10/278,349, filed Oct. 22, 2002 and entitled "EXTENDABLE TRACKING BY LINE AUTO-CALIBRATION", which is hereby incorporated by reference.

The data fusion component 180 can combine all manner of models, images, video, and data in a coherent visualization to support improved understanding, information extraction, and dynamic scene analysis. The geometric models and images can be merged to create coherent visualizations of multiple image sources. An image projection method can be adapted to enable image streams of the real environment to dynamically augment the view of a 3D model. This AVE process can be complementary to that of an augmented reality (AR) in which computer graphics dynamically augment the view of a real environment.

The image projection can also provide an effective mechanism for scene segmentation and error identification during the model reconstruction process. This can be useful for reducing the ambiguities frequently created by noisy data, which can occur with LiDAR systems. A database used by the system 100 can incorporate geometry and temporal imagery for objects in the environment, and thus object surfaces and features can be accurately mapped from images acquired by the varying configurations of tracked cameras, thus helping in the identification and correction of model errors.

The visualization sub-system 190 can provide users with immersive viewing and control over the visualization. For example, the display can be an eight by ten foot screen, video-projected by a stereo video projector (e.g., a sequential-frame stereo video-projector). A tracker (e.g., a ceiling tracker) can be used to couple the rendering viewpoint to a user's head position, providing a user with a highly immersive visualization environment.

Figure 3:
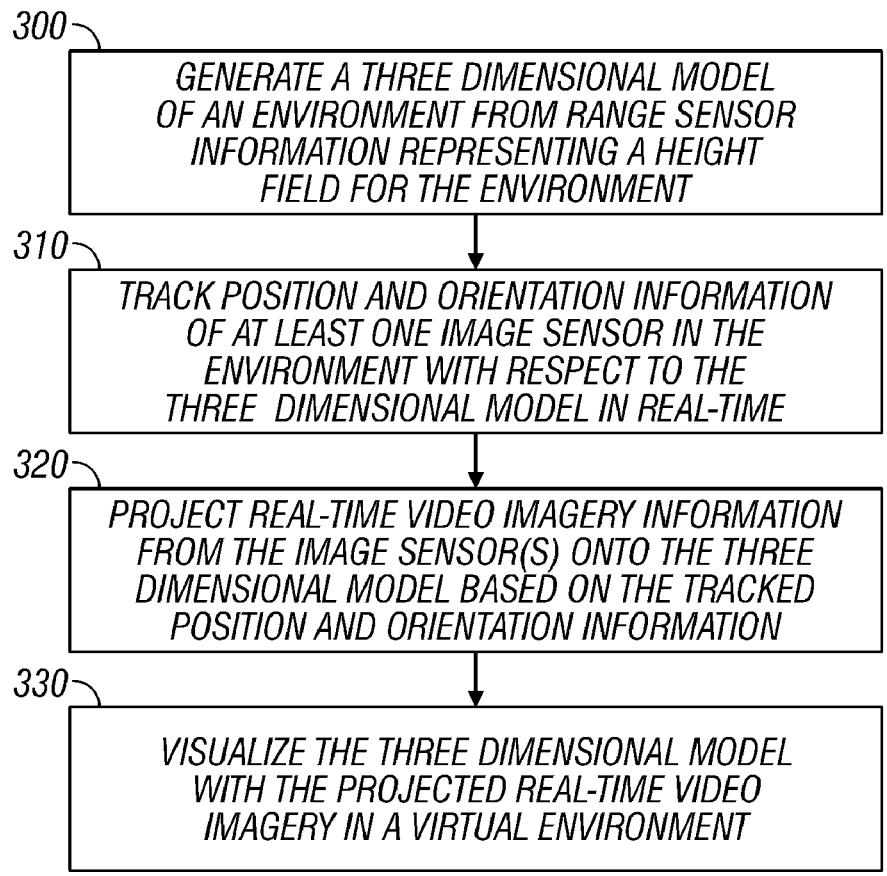
FIG. 3 is a flowchart illustrating a process that generates an augmented virtual environment.

FIG. 3 is a flowchart illustrating a process that generates an augmented virtual environment. A three dimensional model of an environment can be generated from range sensor information representing a height field for the environment at 300. Position and orientation information of at least one image sensor can be tracked in the environment with respect to the three dimensional model in real-time at 310. Real-time video imagery information from the image sensor(s) can be projected onto the three dimensional model based on the tracked position and orientation information at 320. The three dimensional model with the projected real-time video imagery can be visualized at 330.

Figure 5:
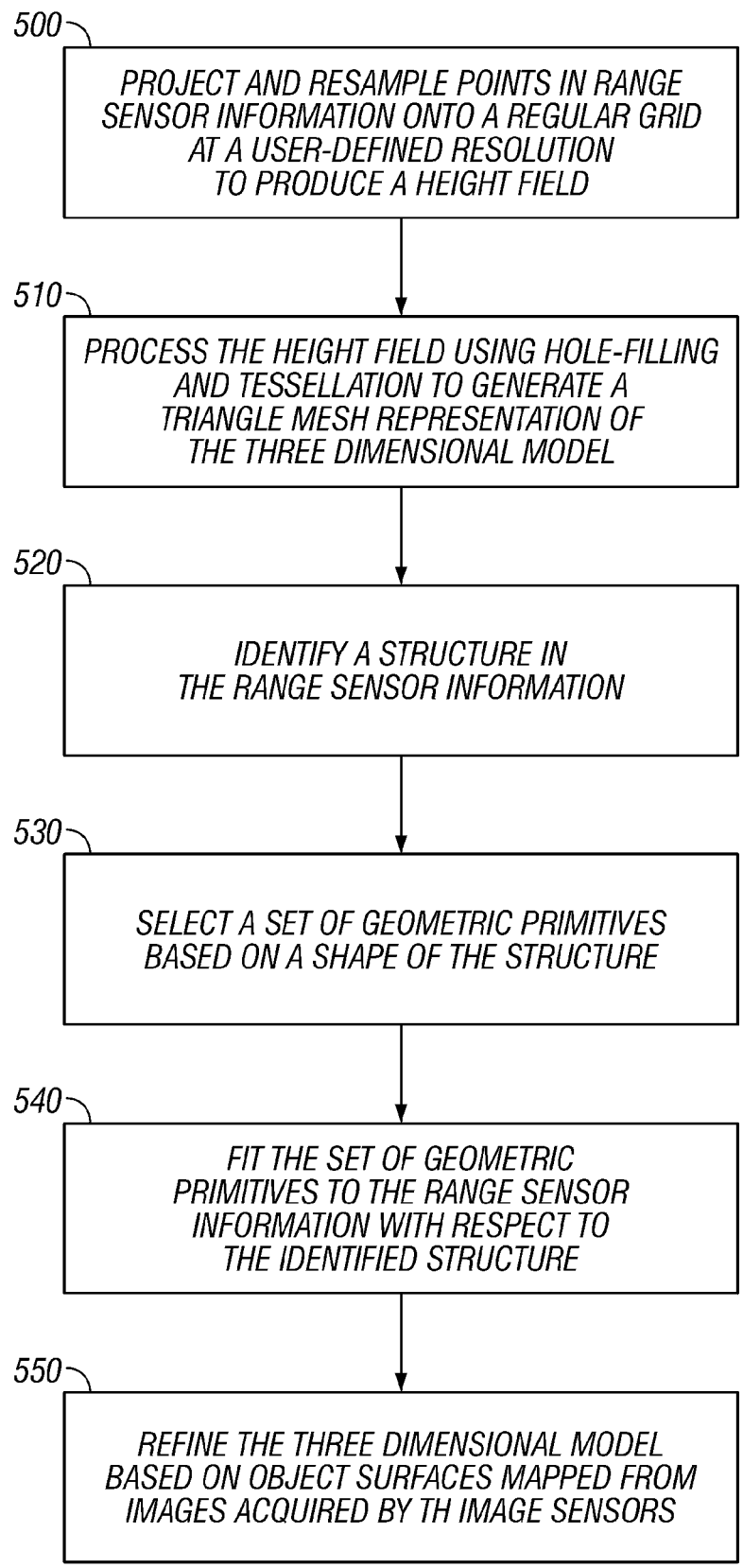
FIG. 5 is a flowchart illustrating a process that generates a three dimensional model of an environment.

FIG. 5 is a flowchart illustrating a process that generates a three dimensional model of an environment. Points in range sensor information can be projected and resampled onto a regular grid at a user-defined resolution to produce a height field at 500. The height field can be processed using hole-filling and tessellation to generate a triangle mesh representation of the three dimensional model at 510. The range sensor information can be LiDAR model data in the form of a cloud of 3D point samples registered to a world coordinate system (e.g., Airborne Topographics Mapper data provided by Airborn1 Corporation of El Segundo, Calif.). The raw LiDAR data can be processed by grid resampling, hole-filling, and tessellation to reconstruct a continuous 3D surface model.

The tessellation operation can use Delaunay triangulation, which can better preserve the topology and connectivity information of the original data than other techniques in this context. The hole-filling operation can be performed by directly interpolating the depth values in the range image in order to preserve the geometric topology of the model. To preserve the edge information, an adaptive-weighting neighborhood interpolation can be used. The interpolation weights can be determined by an inverse function of the distance between the neighbor points and the point to be interpolated. The window size of interpolation can be adaptive to the surface-hole size. When the surface-hole size is only a few points, a small window can be used that contains the close neighbors for weighing interpolation. For the large holes, the window size can be increased to ensure sufficient points for interpolation.

Triangle meshes can be used as the 3D geometric representation to facilitate further processing. Triangle meshes can easily be converted to many other geometric representations. Many level-of-detail techniques can operate on triangle meshes. Photometric information can easily be added to triangle mesh data in the form of texture projections. Typical graphics hardware directly supports fast image rendering from meshes.

Range sensor information, such as that provided by LiDAR, offers a fast and effective way to acquire models for a large environment. In urban areas, range sensor information can provide useful approximations of buildings and structures (e.g., any large urban feature). A structure can be identified in the range sensor information at 520. The range sensor information can provide a clear footprint of a building's position and height information. This global geometric information can be used to determine a building's geo-location and isolate it from the surrounding terrain.

Identification of buildings in the range sensor information can be based on height. For example, applying a height threshold to the reconstructed 3D mesh data can create an approximate building mask. The mask can be applied to filter all the mesh points, and those masked points can be extracted as building points. In addition to height, area coverage can also be taken into consideration in this identification process. Moreover, the height and area variables used can be set based on information known about the region being modeled.

A set of geometric primitives can be selected based on a shape of the structure at 530. For example, based on a building's roof shape (e.g., flat-roof, slope-roof, sphere-roof, gable-roof, etc.), the building model can be classified into several groups (e.g., a building can be classified and modeled in sections), and for each group, appropriate geometric primitives can be defined. The set of geometric primitives can be fit to the range sensor information with respect to the identified structure at 540. The geometric primitives can include linear fitting primitives, such as cubes, wedges, cylinders, polyhedrons, and spheres, and also nonlinear fitting primitives, such as superquadratics.

A high-order surface primitive can be useful in modeling irregular shapes and surfaces, such as classical dome-roof buildings and a coliseum or arena. Superquadrics are a family of parametric shapes that are mathematically defined as an extension of non-linear general quadric surfaces, and have the capability of describing a wide variety of irregular shapes with a small number of parameters. Superquadrics can be used as a general form to describe all the nonlinear high-order primitives, as defined in:

$$r(\eta, \omega) = \begin{bmatrix} a_1 \cos^{\epsilon_1}\eta \cos^{\epsilon_2}\omega \\ a_2 \cos^{\epsilon_1}\eta \sin^{\epsilon_2}\omega \\ a_3 \sin^{\epsilon_1}\eta \end{bmatrix} \quad \begin{matrix} -\pi/2 \le \eta \le \pi/2 \\ -\pi \le \omega \le \pi \end{matrix} \quad (1)$$

where $\epsilon_1$ and $\epsilon_2$ are the deformation parameters that control the shape of the primitive, and the parameters $a_1$, $a_2$ and $a_3$ define the primitive size in x, y and z directions respectively. By selecting different combination of these parameters, a superquadric can model a wide variety of irregular shapes, and also many standard CG (Common Graphics) primitives as well.

Once defined, each building primitive can be represented as a parametric model. The parametric model can describe the primitive by a small but fixed set of variable parameters. The number of parameters specified can depend on the properties of each primitive and the knowledge assumed for the model fitting. For example, a generic plane in 3D space can be represented as $$z = ax + by + c \quad (2)$$

which has three parameters to be estimated. However, in the case of slope-roof fitting, the parameters may be reduced from three to two by setting either parameter a or b to zero. This is based on the observation that if a building's orientation is nearly parallel to the x or y axis of defined world-coordinates, then either parameter a or b will be close to zero for most buildings, i.e., the roof of a building usually has only one slope along the x or y direction. This constraint (referred to as the zero x/y slope constraint) for slope-roof fitting can be used, and similar constraints can also be established for other primitives.

Building sections can be classified into several groups, in which appropriate building primitives are defined. The selected building section, i.e., a current element of interest (EOI), can be indicated in the system as a square area roughly bounding the building section. This EOI information can be provided by a user with a few mouse clicks, or the system can automatically determine the EOI information using a heuristic that processes standard deviations and derivatives of the height data.

The flat-roof is a typical roof type of man-made buildings, which can be modeled using the plane-primitive group, including 3D plane, cuboids, polyhedron, and the combined primitives such as hollow-cuboids. They all share the same property that the depth surface can be described by equation (2). A 3D plane primitive can be determined by two reference points and an orientation. If the building's orientation is aligned to the global direction that is defined in the working coordinates, the specified parameters can be reduced to two, i.e., each plane can be specified by two diagonal-points.

With the two reference points, the system automatically estimates all corners of the building roof based on the global direction. The estimated corner points can be used for detecting the roof edges using a depth discontinuity constraint. An improved 8-neighbors connectivity algorithm can be used to detect building edges. First, the geometry connectivity information of a Delaunay reconstruction can be used to track the connected edge points. Those edges that lie along the Delaunay triangulation can be accepted as the possible edge points.

Second, a depth filter can be used to constrain the detected edges. The depth filter can be applied to all the possible edge points, and those points having similar depth values as that of the defined reference points can pass as correct edge points. Once the roof borders have been extracted, they can be parameterized using least-square fitting, and then the roof corners can be refined again based on the fitted roof borders.

Plane depth fitting can be performed on all the surface points inside the roof border. The depth discontinuity constraint can be used for surface segmentation. Surface-normal information can be used, but may not be preferable due to its sensitivity to noise. The depth discontinuity constraint generally performs well for surface segmentation. After segmenting the surface points, the plane least-square fitting can be applied to the depth values of those points, and the best fitting can be the height of the refined surface.

Slope is a special case of the plane with non-zero horizontal or vertical normal direction. Similar to the plane primitive, a sloped roof with rectangular edges can be extracted with two reference points using the plane fitting method. The depth fitting for sloped surfaces, however, is more complex. A 3D plane defined in equation (2) has three parameters to be estimated, where the two parameters a, b, represent two slopes in the x and y directions, and the parameter c is an offset. But the parameters can be reduced from three to two based on the zero x/y slope constraint.

In the case of a building that does not meet the condition, an orientation alignment can be performed to orient the building to the reference direction. The least-square method can also be used for parameter estimation, using all the surface points inside the detected roof borders. Many roofs of real buildings frequently have two symmetric slopes. To facilitate this structure, the two connected slope primitives can be combined to form a new primitive: roof.

In this case, three reference points (rather than four if the two slopes were modeled separately) can be used for parameter estimations: two on the slope edges, and one on the roof ridge. The surface points of the two symmetric slopes can be segmented using the above method. The least-square fitting can be performed on the depth values of the segmented surface points for each of the two slope primitives. The accurate roof ridge can be computed based on the intersection of the two modeled slope planes.

Surface fitting of a generic cylinder is a nonlinear optimization problem. However, many cylinder primitives in buildings have an axis perpendicular to the ground. Based on this constraint, the rotation parameter can be eliminated from the estimate to simplify the primitive as a vertical cylinder for circle-roofs. The roof extraction and surface segmentation can be similar to the plane case, using the depth discontinuity constraint. Two concentric circles can be defined for segmentation: the inner circle for roof border detection, and the outer circle for surface point segmentation.

Three parameters can be used for specifying the concentric circles: one for the circle center and two for the radius. To guarantee there are enough surface points for accurate segmentation and model fitting, the defined circles should cover all the possible surface points on the rooftop. To achieve an accurate boundary reconstruction from the typically ragged mesh data, two filters can be defined to refine the detected edges: a depth filter constraining the edge points having similar depth values as that of the defined center, and a distance filter constraining the edge points to being inside of the estimated circle.

The depth filter can be similar as the one applied for plane primitives, but using the circle center's depth value as a filtering threshold. The distance filtering can be a recursive procedure. The detected edge points can be fit to the circle model to obtain initial estimates of the circle center and radius. These initial estimates can be used to filter the detected edges. Any edge points whose distance to the circle center is less than a threshold can then pass the filtering. The distance deviation can be used as a filtering threshold. After the distance filtering, the refined edge points can be used recursively to estimate a new border parameter.

The dome-roof is a common roof type in classical buildings. A simple dome-roof can be modeled as a sphere shape, but more complicated ones may need high-order surfaces to represent them. Similar to the cylinder primitive, the surface of a sphere is also a quadric surface. To detect the roof border and surface points, two reference values can be used: one for dome-roof center and another one for roof size.

To guarantee enough surface points for accurate segmentation and fitting, the defined area should cover all the possible points on the roof surface. Since the section-projection of a sphere is a circle, the methods for sphere-roof detection and surface segmentation can track those used for the cylinder primitive, except for not using the depth filtering as the sphere center in 3D space may not be defined. The model fitting can be performed on all the segmented spherical surface points.

As in the cylinder case, the distance constraint can be recursively used to achieve an accurate model reconstruction. The sphere primitive can also be combined with other type primitives. A popular usage is the sphere-cylinder combination. Another use of sphere primitives is their use as a preprocessing step for high-order surface fitting. High-order surface fitting normally is a non-linear problem. Appropriate selection of initial estimates can be useful in obtaining a convergence to an optimal solution.

High-order modeling primitives can be used to facilitate modeling of complex objects and irregular building structures, and may be combined with standard CG primitives. Superquadrics are a family of parametric shapes that are mathematically defined as an extension of nonlinear generic quadric surfaces. They have the capability of describing a wide variety of irregular shapes with a small number of parameters. The superquadric can be used as a general form to describe all the nonlinear high-order primitives. As an example of applying the high-order primitives to model irregular building shapes, the following is a description of modeling the Los Angeles Arena with an ellipsoid primitive. The ellipsoid is a special case of superquadrics with the deformable parameters $\epsilon_1=1$, $\epsilon_2=1$.

Object segmentation can use a region-growing approach to segment the irregular object from its background. Given a seed-point, the algorithm automatically segments the seeded region based on a defined growing rule. For example, the surface normal and depth information can be used to supervise the growing procedure. Initial surface fitting can use an appropriate initial value with the Levenberg-Marquardt (LM) algorithm to help guarantee a converged optimal solution. A sphere primitive fitting can be used for system initialization. The system can perform high-order surface filling, once initialized, by fitting the ellipsoid primitive to the segmented surface points using the LM algorithm. In this Arena modeling example, the algorithm can use six hundred and six iterations to converge to the correct solution.

As the models thus generated from constructive solid geometry allow the composition of complex models from basic primitives that are represented as parametric models, this approach is very general. The type of primitive is not limited and may contain objects with curved surfaces, so the flexibility of model combinations is very high. Thus, a large range of complex buildings with irregular shapes and surfaces can be modeled by combining appropriate geometry primitives and fitting strategies.

These techniques can be automatically applied to all buildings in the range sensor information, either in sequence or in parallel. For example, once the buildings are detected and segmented, the predefined geometric primitives can be iteratively fitted to the data and the best fitting models can be used to represent the building structures. A person can assist in selecting the group type and thus the associated primitives, or this group type selection can be fully automated. Once the group has been selected, the system can perform the primitive fitting and assembly of buildings from multiple primitives. The system can also include editing tools that allow users to modify the models or obtain a specific representation quickly and accurately.

The system can extract a variety of complex building structures with irregular shapes and surfaces, and this scene segmentation and model fitting approach to building a 3D model of a large urban environment can enable rapid creation of models of large environments with minimal effort and low cost. The range sensor information can be used to generate highly accurate 3D models very quickly, despite resolution limitations and measurement noise that may be present in the range sensor information. The 3D model can be easily updated and modified. Moreover, undersampled building details and occlusions from landscaping and overhangs can also be handled without resulting in data voids.

The three dimensional model can be refined based on object surfaces mapped from images acquired by the image sensors at 550. The dynamic image projection can provide an effective way to detect modeling errors and reduce them. By dynamically projecting imagery and/or video of the scene onto its corresponding geometric model, viewing from arbitrary viewpoints can quickly reveal model fidelity and/or errors. For example, users can verify and refine the models from different angles to cover the complete model surface; the range sensor data and the model that is fit to the range sensor data can be superimposed for visual verification, and accurate building models can be extracted.

Referring again to FIG. 1, tracking sensor(s) 130 can be attached to an image sensor 120, allowing the image sensor to be moved around the scene for viewpoint planning and data fusion. An image sensor 120 can be a mobile sensor platform on an aerial vehicle, a ground vehicle or a person that includes a video camera obtaining a real-time video stream. An image sensor 120 can also be a fixed position image sensor with the ability to change its orientation. Because the orientation and position of each image sensor 120 can be known, multiple video streams can be simultaneously projected onto the scene model, thereby presenting the observer with a single coherent and evolving view of the complete scene.

Moreover, the images acquired by the image sensors 120 can be used to both visualize dynamic changes in the scene and refine the 3D geometry; and tracking information can be used for data registration and assembly during the model reconstruction phase.

Figure 2:
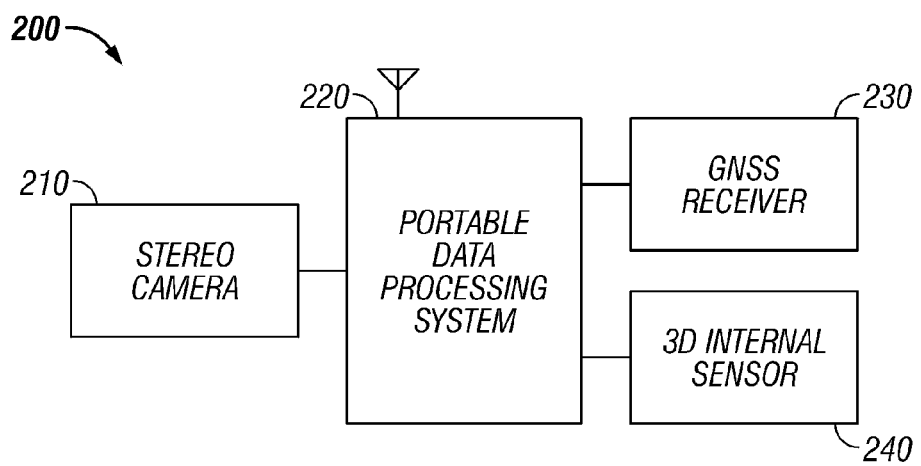
FIG. 2 is a block diagram illustrating a portable data acquisition and tracking system.

FIG. 2 is a block diagram illustrating a portable data acquisition and tracking system 200. The system 200 is a hybrid tracking approach that can provide a robust and precise tracking system for use in an outdoor environment. The system 200 can integrate vision, GPS, and inertial orientation sensors to provide six DOF pose tracking of a mobile platform.

The system 200 can be a self-contained portable tracking package (e.g., a backpack) that includes a stereo camera 210 (e.g., a real-time stereo head, such as the MEGA-D from Videre Design of Menlo Park, Calif.). The system 200 can include a global navigational satellite system (GNSS) receiver 230, such as a differential GPS receiver (e.g., a Z-Sensor base/mobile from Ashtech). The system 200 can also include a three DOF inertial sensor 240 (e.g., an IS300 from Intersense), and a portable data processing system 220 (e.g., a laptop computer).

The stereo camera 210 can be two high resolution digital cameras using a Firewire (IEEE (Institute of Electrical and Electronics Engineers) 1394) interface to the portable data processing system 220. The dual camera configuration allows one channel (e.g., the left channel) of the acquired video stream to be used for video texture projection and vision tracking processing, while the stereo stream can be used in detailed building facade reconstruction.

The integrated GNSS receiver 230 and inertial sensor 240 can track the system's six DOF (position and orientation) pose. The GNSS sensor can be a GPS sensor with two working modes: a differential mode and a single mode. For example, a differential GPS mode (DGPS) can include two RTK (Real-time kinematic) units (base and remote) communicating via a spread spectrum radio to perform position calculations. The DGPS can track positions to about ten centimeter accuracy. The GNSS sensor 230 can be switched between the two modes as need.

The inertial sensor 240 can be attached to the stereo camera 210 to continually report the camera orientation. The sensor 240 can incorporate three orthogonal gyroscopes to sense angular rates of rotation along the three perpendicular axes. The sensor 240 can also include sensors for the gravity vector and a compass to compensate for gyro drift. The measured angular rates can be integrated to obtain the three orientation measurements (yaw, pitch and roll). This orientation tracker can achieve approximately one degree RMS static accuracy and three degrees RMS dynamic accuracy, with a 150 Hz maximum update rate.

The tracking system 200 can run in real-time including sensor and video acquisition, storage, and transmission. The sensors in the tracking system 200 may run at different updates rates (e.g., the DGPS may update at about one Hz, the inertial sensor may run at 150 Hz, and the video camera frame rate may be 30 Hz). This can be compensated for by synchronizing and resampling all three data streams at a common rate (e.g., the 30 Hz video rate).

In order to maintain accurate registration between the geometric models and the real video textures, a complementary vision tracker can be used to stabilize the tracked camera pose. The tracked camera pose defines the virtual video projector used to project texture images onto the 3D geometric models, so pose tracking accuracy can directly determine the visually perceived accuracy of projected texture registration. Moreover, vision tracking can also be used to overcome cases of GNSS dropouts caused by satellite visibility occlusions.

The vision tracker can be based on feature auto-calibration, adapted for this application. Vision tracking can use an Extended Kalman Filter (EKF) framework that can extend tracking range from an initial calibrated area to neighboring uncalibrated areas. Starting from a known initial estimate of camera pose, which can be obtained from any method or sensors (e.g., the GNSS-inertial tracker), the camera pose can be continually estimated using naturally occurring scene features based on a prediction-correction strategy.

Both line and point features of a scene can be used for tracking. Straight lines are typically prominent features in most man-made environments, and can be detected and tracked reliably. The line feature can be modeled as an infinite straight line, and its observed line segments in different views may correspond to different portions of the same line. Point features are also useful for tracking, especially when the user is close to scene surfaces, in which case, there may not be lines visible for pose estimation.

An EKF can estimate pose based on both line and point features. The camera state can be represented as a six dimension vector of position, incremental orientation, and their first derivatives:

$$[x,y,z,x',y',z',\Delta\theta,\Delta\vartheta,\Delta\psi,\theta',\vartheta',\psi']$$

The linear dynamic model can be used for state prediction, and both line and point features can be used as measurements for the EKF state update. For every new frame, the tracker can first predict the camera pose based on the prediction equation. The model features can then be projected back on the image plane based on the prediction, and the discrepancy between projected features and observed features can be used to refine the prediction.

Once calibrated, the camera internal parameters can be assumed fixed during the tracking session. Using these vision tracking techniques, observed image elements can properly retain their alignment with the 3D positions and orientations of model objects as cameras change their viewpoints.

Referring again to FIG. 1, the dynamic fusion imagery projection component 180 can dynamically fuse the data of multiple spatio-temporal information sources from geometric models, images, video and other sensing information. Texture images can be associated with the sensor and the sensor's pose within the model. The mapping between the model and the image can be created dynamically as a result of image projection during the rendering process. Thus, changing the model and sensor relationships automatically changes the mapping function and associated imagery, and also the relationships of visibility and occlusion. As new images arrive, or as the scene changes, the sensor pose and image information can simply be updated, rather than repeating the time consuming process of finding mapping transformations.

The system 100 can use a model of perspective image projection, a strategy to handle the problem of visibility and occlusion detection, and an accurate sensor model including camera parameters, projection geometry, and pose information. Projective texture mapping can be used by the system 100. This technique models the process of perspective image projection by casting the lines of light onto objects using the light source position as the projection center.

The texture coordinates can thus be automatically assigned to model surface points in the rendering process. By specifying an image of the scene as a texture and specifying the camera pose, the image can be projected back onto the scene geometrically. As the camera moves, its changing pose and imagery can dynamically paint the acquired images onto the model; the projector parameters are the same as the camera parameters: viewing transform and view volume clipping. These allow for dynamic control during rendering.

Figure 6:
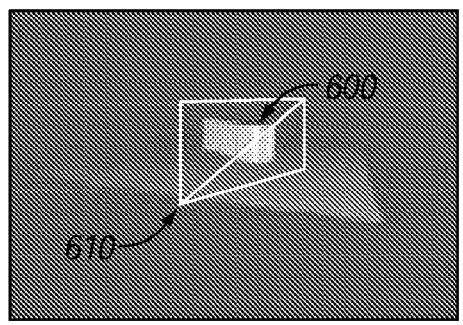
FIGS. 6-9 illustrate projection of real-time video imagery information onto a three dimensional model.
Figure 7:
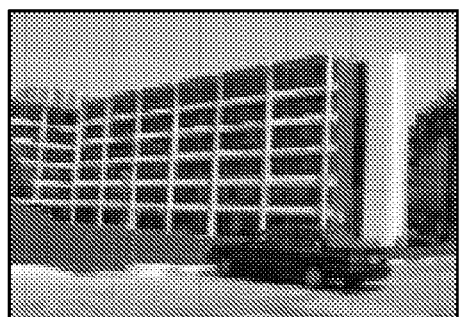
Figure 8:
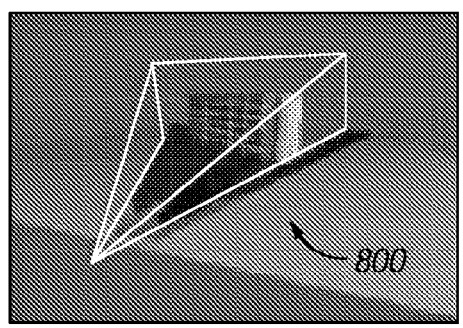
Figure 9:
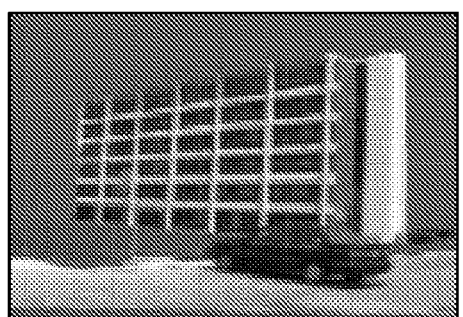

FIGS. 6-9 illustrate projection of real-time video imagery information onto a three dimensional model. FIG. 6 illustrates a modeled building structure 600 and a projection frustum 610 created by a known camera pose. FIG. 7 illustrates the initial camera image 700. FIG. 8 illustrates projection 800 of the image onto the model. FIG. 9 illustrates the rendered view 900 in an AVE system.

While image projection is a powerful approach to integrating dynamic imagery with 3D models, the issue of occlusions should be taken into consideration. Referring again to FIG. 1, the projection component 180 can ensure that the projections texture the surfaces visible to the camera that captured the images. Thus, the projection component 180 can modulate the projection process with visibility information.

Visibility detection should be fast in order to achieve a real-time visualization session. Depth-map shadows can be used as an approach to fast visibility detection that is supported by many high performance graphics cards, such as NVIDA's Geforce 3 GPU, which supports 24-bit shadow maps. The depth-map shadows process produces a depth map that is used as a texture image. Based on a comparison of the projected depth value against the r component of texture coordinates, the projection component 180 can determine if the surface point is visible or hidden from an image sensor 120.

Figure 4:
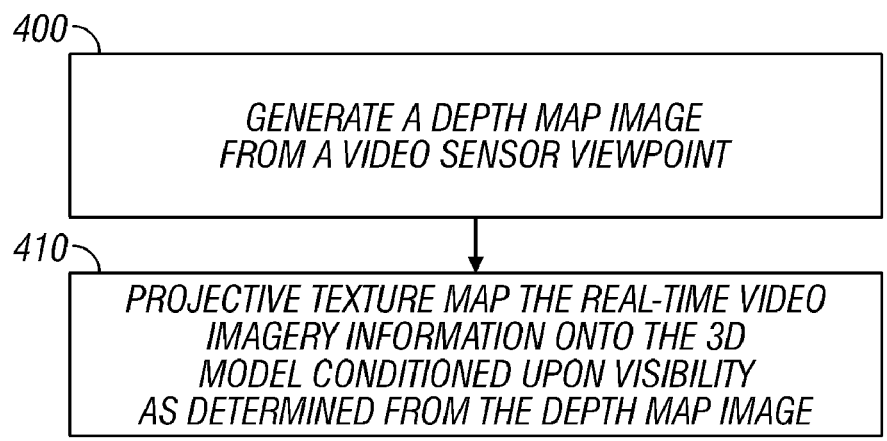
FIG. 4 is a flowchart illustrating a process of projecting real-time video imagery.

FIG. 4 is a flowchart illustrating a process of projecting real-time video imagery. A depth map image can be generated from a video sensor viewpoint at 400. Then real-time video imagery information can be projective texture mapped onto the three dimensional model conditioned upon visibility as determined from the depth map image at 410. This approach represents a two-pass process: a first pass for generating the depth image needed for comparisons, and a second pass for image projection, conditional upon visibility testing. However, this can be implemented as a one-pass approach utilizing graphics hardware that supports SGI OpenGL extensions.

Referring again to FIG. 1, a P4 2G system using this approach can achieve real time rendering at 26 Hz of 1280× 1024 images with four texture streams projected onto the 3D model. By including the sensor information into the AVE database, the system 100 permits users to dynamically control the sensor within the virtual environment scene and simultaneously view the information visible to that sensor mapped onto a geometric model from an arbitrary viewpoint.

The projection process can involve loading the video imagery and sensor pose streams into memory buffers and converting them to the formats used for texturing and projection. The video and sensor streams can be synchronized during the data acquisition process so that each frame of the video has a timed sensor tag associated with it, including the sensor's internal parameters and 6DOF pose information. The sensors, geometric model and images can come from multiple modalities with different coordinate reference, and these can be converted constantly into a common coordinate reference that is defined in the model system.

Once in the memory buffers, the data is ready for processing and texturing. The sensor's internal parameters can be used for specifying the virtual projector's projection, and the pose data can define the projector's position and orientation. This process can sequentially use model and projection matrix operations. Sequentially specifying multiple projectors allows simultaneous projection of multiple images onto the same model.

Projection visibility can be computed using the depth shadow mapping method for each sensor from its viewpoint. The occluded portions can keep their original colors or blend with other projections, depending on application and user preferences. After texture coordinates generation and projective mapping, the projection can be clipped to the sensor's viewing frustum specified by the sensor parameters. This can be done using the stencil operations: drawing the outside of the frustum with a stencil increment operation, and the inside with a stencil decrement operation, therefore masking the projection pass to the regions of the screen where the scene falls within the sensor frustum.

The visualization sub-system 190 can include a virtual reality display headset, a large 3D visualization screen, and/or a quad-window display interface to maximize visualization effectiveness. The quad-window display can simultaneously show the 3D geometric model, the 2D video image prior to projection onto the 3D model, the fusion result viewed from a novel viewpoint, and a rendered view from an image sensor viewpoint. The four windows can be linked to each other and can be interactively controlled during visualization sessions. The large 3D visualization screen can be an 8×10 foot screen, video-projected by a stereo video-projector. A 3rdTech ceiling tracker can be used to couple the rendering viewpoint to user's head position. A tracker can also facilitate mouse-like interactions.

Additionally, the projection component 180 can fuse multiple simultaneous image streams onto the 3D model. The system 100 provides the 3D substrate model that ties the multiple streams together and enables a person to readily understand images from multiple cameras, which may be moving as well. The system 100 can support multiple texture projectors that can simultaneously visualize many images projected on the same model. This can result in a coherent presentation of the multiple image streams that allows the user of the system 100 to easily understand relationships and switch focus between levels of detail and specific spatial or temporal aspects of the data.

The AVE fusion presentation can present huge amounts of visual data at varying levels of detail all tied to a reference model that makes the activities within and between multiple images comprehensible.

Figure 10:
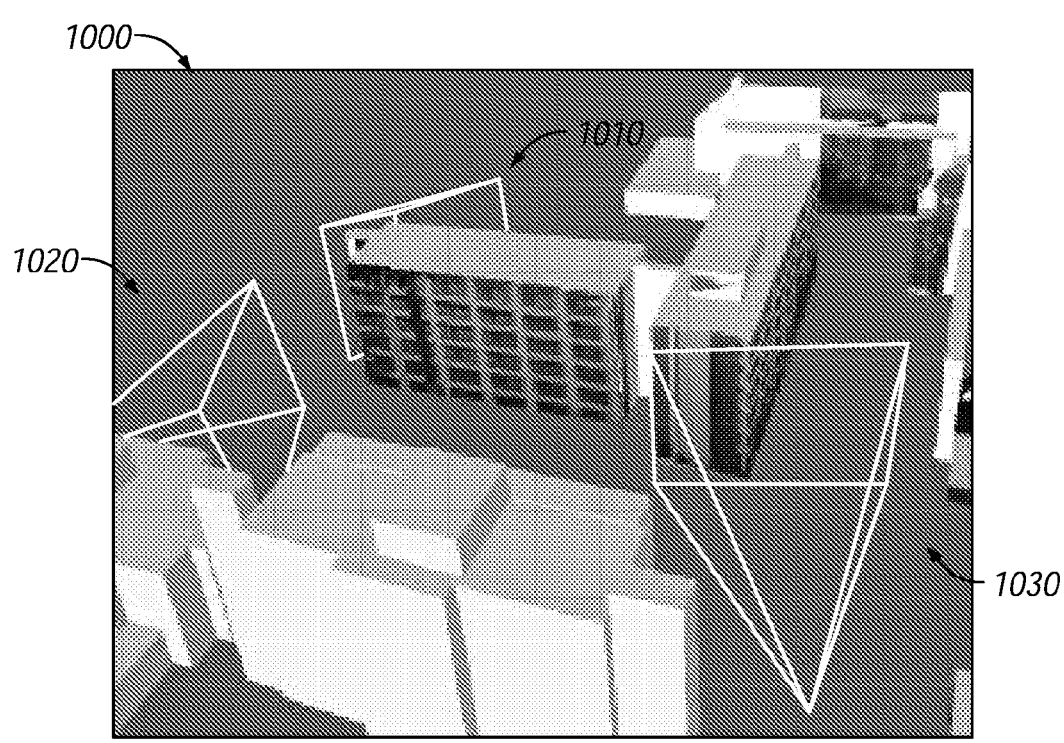
FIG. 10 shows three sensors projecting onto one model simultaneously.
Figure 11:
FIGS. 11-13 show rendered views from the three camera (projection) viewpoints of FIG. 10.
Figure 12:
Figure 13:

FIG. 10 shows three sensors projecting onto one model simultaneously. Three video projections 1010, 1020, 1030 within one model area 1000 are illustrated, creating an augmented virtual environment that allows a person to visualize and comprehend multiple streams of temporal data and imagery. FIG. 11 shows a rendered view from the camera (projection) viewpoint 1010. FIG. 12 shows a rendered view from the camera (projection) viewpoint 1020. FIG. 13 shows a rendered view from the camera (projection) viewpoint 1030.

Figure 14:
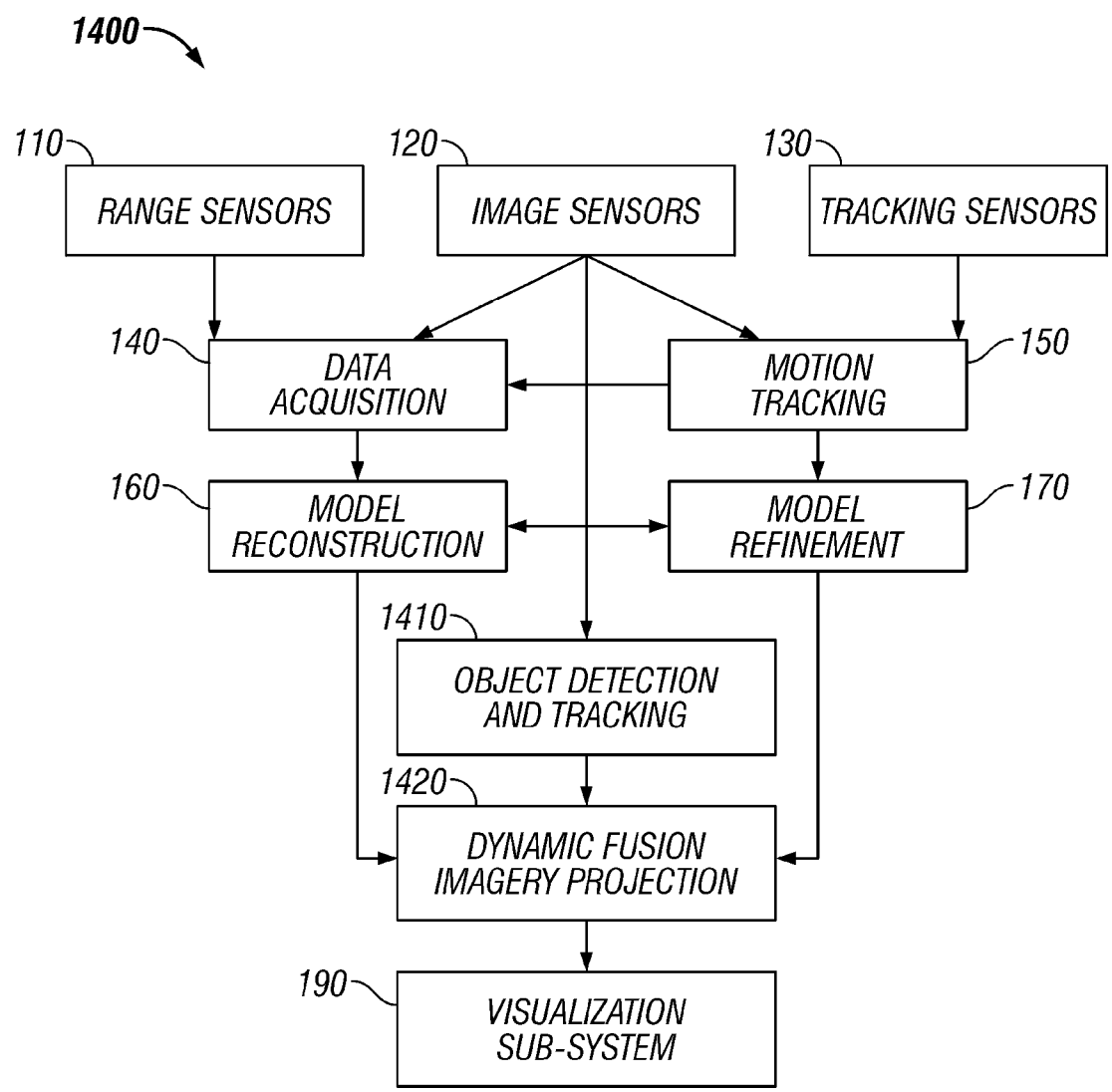
FIG. 14 is a block diagram illustrating another augmented virtual environment system.

FIG. 14 is a block diagram illustrating another augmented virtual environment system 1400. The system 1400 can include components 110-170, 190 and function as the system 100 described above in connection with FIG. 1, but also includes the ability to model dynamic geometry and appearance changes of moving objects, such as people and vehicles, within the scene. The inclusion of dynamic models in an augmented virtual environment can improve complex event visualization and comprehension, such as in command and control and surveillance applications.

An object detection and tracking component 1410 can derive dynamic aspects of the model from real-time video imagery and other sensor data gathered from multiple, and possibly moving sources in the scene. The component 1410 can detect and track moving regions in real-time video imagery to facilitate the modeling of dynamic scene elements in real-time. The output of the object detection and tracking component 1410 can be provided, along with the real-time video imagery, to a dynamic fusion imagery projection component 1420. The fusion component 1420 can perform as the fusion component 180 described above, and the fusion component 1420 can also dynamically add moving objects in real time to the three dimensional model based on the output of the object detection and tracking component 1410.

The object detection and tracking component 1410 and the dynamic fusion imagery projection component 1420 can be used with other system configurations as well. For example, the three dimensional model of the environment can be generated differently, including being generated elsewhere and being obtained (e.g., loaded from disk) by the system 1400. Moreover, the image sensors need not be mobile sensors with the described position and orientation tracking capabilities, but may rather be fixed image sensors with known positions and orientations.

Figure 15:
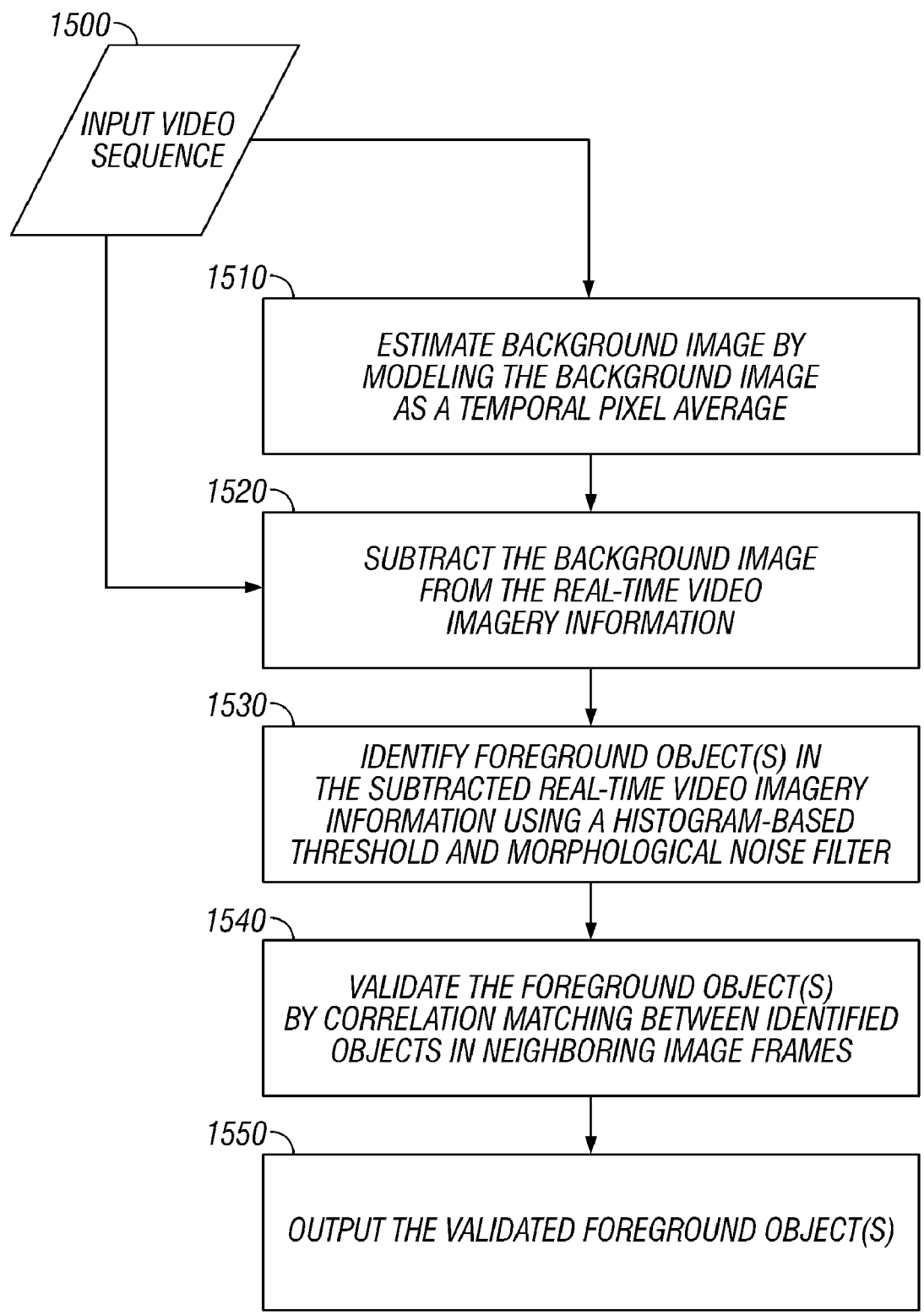
FIG. 15 is a flowchart illustrating a process of analyzing video imagery to segment and track moving objects in a scene in real time.

FIG. 15 is a flowchart illustrating a process of analyzing video imagery to segment and track moving objects in a scene in real time. A background image can be estimated at 1510 by modeling the background image as a temporal pixel average of real-time video imagery information (e.g., an input video sequence 1500). The background image can be subtracted from the real-time video imagery information at 1520.

The background estimation can largely determine the performance of the overall system. A variable-length time average can dynamically model a single distribution background, as opposed to using a Gaussian based background model. Detecting foreground objects involves characterizing the similarity between new observations and the background model. The Euclidean distance of the measurements can be used as the similarity criteria:

$$\Delta I_i(x,y) = \|I_i(x,y) - B_k(x,y)\| \quad (2)$$

where $\Delta I_i(x,y)$ is the difference image, and $I_i(x,y)$ is the input image at frame i. $B_k(x,y)$ is the modeled background image, which can be dynamically updated at selected time interval k, which can be from several seconds to several days.

The background image can be modeled as a temporal pixel average of recent history frames:

$$B_k(x, y) = \frac{1}{N} \sum_{n=0}^{N} I_{i-n}(x, y), \quad (4)$$

where N is the number of frames used for calculating the background model. N can be set to five, which can offer performance similar to that of a single Gaussian distribution, with lower computation complexity.

One or more foreground object(s) can be identified in the subtracted real-time video imagery information using a histogram-based threshold and a morphological noise filter at 1530. In general, a pixel can be considered a foreground candidate if its difference value is above a pre-defined threshold. Otherwise the pixel can be classified as background.

The parameters of this foreground-background classification can be estimated by taking the quality of the video recorders and the size of the foreground target into consideration. The threshold can be pre-trained off-line, and the optimal value can be obtained such that only the top five percent differences are labeled as potential foreground objects. From the classified results, a mask image can be constructed by using a two-pass 4-neighbors connectivity algorithm. The mask image can be used to filter the input image to derive the foreground object regions.

To reduce noise, a morphological filter can be used to constrain the segmented objects. The filter can be applied to all the possible foreground regions, and only those regions with areas large enough are then passed as correct foreground objects. For example, objects smaller than 0.1 percent of the image size can be filtered out as noise.

The identified foreground object(s) can be validated by correlation matching between identified objects in neighboring image frames at 1540. This can be understood as pseudo-tracking of moving objects over time to confirm that they should be modeled separately in the environment. Objects that are validated for less than a second can be eliminated. This can eliminate spurious new object detections, such as for waiving trees or other foliage.

A normalized intensity correlation can be used as the matching criteria to measure the similarities between two detected regions. The sum of squared error of a 10×10 window located at the center of the objects can be evaluated, and the minimum error pairs can be selected as the best tracked matches. Object regions with an acceptable matching score can be assigned a target tag number. The correlation threshold can be determined experimentally by examples and by taking the quality of the video cameras and imaging conditions into consideration.

The validated foreground object(s) can be output at 1550. The final outputs of the detection and tracking system can be the four-corner coordinates $\{x_i | x_i = (x_i, y_i), i = 1 \sim 4\}$ bounding the moving object regions in the 2D image plane. This tracking information can be used for modeling the moving objects and estimating their relative 3D positions in the scene.

Figure 16:
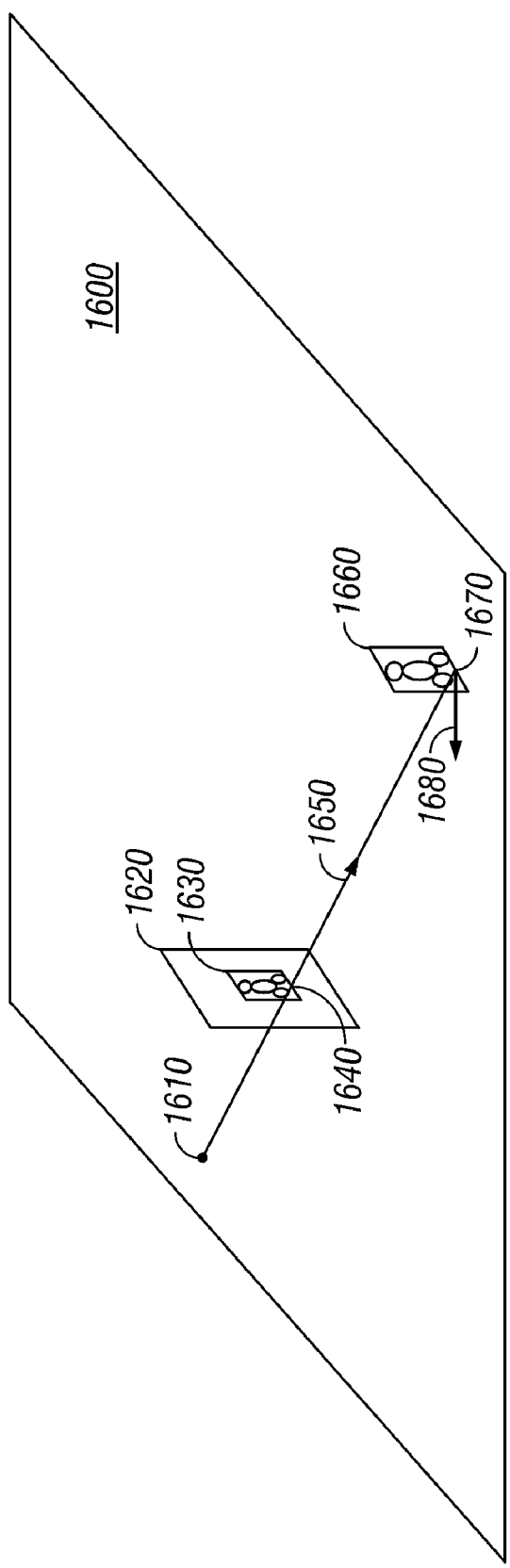
FIG. 16 is a perspective view illustrating a process of using a segmented region of video imagery to determine and dynamically position an approximate model of a moving object in a three dimensional environment model to capture the projection of the segmented imagery.

FIG. 16 is a perspective view illustrating a process of using a segmented region of video imagery to determine and dynamically position an approximate model of the moving object in a three dimensional environment model to capture the projection of the segmented imagery. FIG. 16 illustrates the case of a camera and a tracked object (e.g., a person or vehicle) that rests on the ground 1600 in a three dimensional model. A dynamic model surface 1660 can be placed in the three dimensional model to capture the projection of an identified moving object.

The surface 1660 can be a two dimensional surface or a three dimensional surface. The surface 1660 can be a complex shape that closely fits the identified moving region. For example, a complex polygon can be used, where the polygon has many little edges that follow the outline of the moving object; or a complex 3D shape can be used to more accurately model a moving object (e.g., a 3D surface defined by multiple cubes for a car, and a 3D surface defined by multiple cylinders for a person). In general a simple 2D polygon can be sufficient to create a dynamic object model in the three dimensional environment model that enhances the visualization of moving objects in the augmented virtual environment, and use of a 2D polygon can require less processing in the system.

In the illustrated example, three parameters can define the dynamic model polygon: position, orientation and size. A point 1610 is the 3D optical center of a camera generating an image being processed. A bounding shape 1630 can be a bounding box in an image plane 1620 of the tracked moving object. A point 1640 can be the mid-point of the bottom edge of the bounding box.

Using point 1610 and point 1640, a ray (or vector) 1650 can be cast to intersect with the ground 1600, and the intersection point 1670 can be identified. If no intersection point exists, or if the ray 1650 intersects with a building in the 3D model before it intersects the ground, the tracked object can be identified as an airborne object and dealt with separately using other sensor data, or simply be disregarded for purposes of moving object modeling.

With the assumption that moving objects rest on the ground, point 1670 can be used to define the 3D position of the model surface 1660. The orientation of the model surface 1660 is denoted by a vector 1680, which can be set in the same vertical plane as the vector 1650 and set perpendicular to a scene model up-vector. Two corners of the bounding box 1630 can then be projected onto the model plane to determine the size of the model surface 1660.

This creation of a dynamic model for moving objects can address the distortion that occurs when projecting video containing moving objects onto a static model. A video sensor can capture the dynamic movements of a person or a car in the scene. Dynamic models of the moving objects in the scene can be created and added to an AVE visualization as described to reduce visual distortions. The video texture is projected onto the model as before. Users can freely navigate around the complete model.

The logic flow depicted in FIGS. 3-5 and 15 do not require the particular order shown. Many variations are possible, sequential order of operations is not required, and in certain embodiments, multi-tasking and parallel processing may be preferable.

Other embodiments may be within the scope of the following claims.

What is claimed is:

1. A method comprising: obtaining a three dimensional model of a three dimensional environment, the three dimensional model generated from range sensor information representing a height field for the three dimensional environment;
   identifying in real time a region in motion with respect to a background image in real-time video imagery information from at least one image sensor having associated position and orientation information with respect to the three dimensional model, the background image comprising a single distribution background dynamically modeled from a time average of the real-time video imagery information;
   placing a surface that corresponds to the moving region in the three dimensional model, wherein placing the surface comprises casting a ray from an optical center, corresponding to the real-time video imagery information, to a bottom point of the moving region in an image plane in the three dimensional model, and determining a position, an orientation and a size of the surface based on the ray, a ground plane in the three dimensional model, and the moving region;
   projecting the real-time video imagery information onto the three dimensional model, including the surface, based on the position and orientation information; and
   visualizing the three dimensional model with the projected real-time video imagery; wherein identifying a region in motion in real time comprises subtracting the background image from the real-time video imagery information, identifying a foreground object in the subtracted real-time video imagery information, validating the foreground object by correlation matching between identified objects in neighboring image frames, and outputting the validated foreground objects;

wherein identifying a foreground object comprises identifying the foreground object in the subtracted real-time video imagery information using a histogram-based threshold and a noise filter.

2. The method of claim 1, further comprising tracking the position and orientation information of the at least one image sensor in the environment with respect to the three dimensional model in real-time.

3. The method of claim 2, wherein obtaining a three dimensional model of a three dimensional environment comprises generating the three dimensional model of the three dimensional environment.

4. The method of claim 1, wherein the surface comprises a two dimensional surface.

5. The method of claim 1, wherein identifying a region in motion in real time further comprises estimating the background image by modeling the background image as a temporal pixel average of five recent image frames in the real-time video imagery information.

6. An augmented virtual environment system comprising: an object detection and tracking component that identifies in real time a region in motion with respect to a background image in real-time video imagery information from at least one image sensor having associated position and orientation information with respect to a three dimensional model of a three dimensional environment, the three dimensional model generated from range sensor information representing a height field for the three dimensional environment, the background image comprising a single distribution background dynamically modeled from a time average of the real-time video imagery information, and places a surface that corresponds to the moving region with respect to the three dimensional model, wherein the object detection and tracking component places the surface by performing operations comprising casting a ray from an optical center, corresponding to the real-time video imagery information, to a bottom point of the moving region in an image plane in the three dimensional model, and determining a position, an orientation and a size of the surface based on the ray, a ground plane in the three dimensional model, and the moving region; a dynamic fusion imagery projection component that projects the real-time video imagery information onto the three dimensional model, including the surface, based on the position and orientation information; and a visualization subsystem that visualizes the three dimensional model with the projected real-time video imagery; wherein the object detection and tracking component identifies the moving region by performing operations comprising subtracting the background image from the real-time video imagery information, identifying a foreground object in the subtracted real-time video imagery information, validating the foreground object by correlation matching between identified objects in neighboring image frames, and outputting the validated foreground object; wherein identifying a foreground object comprises identifying the foreground object in the subtracted real-time video imagery information using a histogram-based threshold and a noise filter.

7. The system of claim 6, further comprising a tracking sensor system that integrates visual input, global navigational satellite system receiver input, and inertial orientation sensor input to obtain the position and the orientation information associated with the at least one image sensor in real time in conjunction with the real-time video imagery.

8. The system of claim 7, further comprising a model construction component that generates the three dimensional model of the three dimensional environment.

9. The system of claim 6, wherein the surface comprises a two dimensional surface.

10. The system of claim 6, wherein identifying a region in motion in real time further comprises estimating the background image by modeling the background image as a temporal pixel average of five recent image frames in the real-time video imagery information.

11. A machine-readable storage device embodying information indicative of instructions for causing one or more machines to perform operations comprising:

obtaining a three dimensional model of a three dimensional environment, the three dimensional model generated from range sensor information representing a height field for the three dimensional environment;

identifying in real time a region in motion with respect to a background image in real-time video imagery information from at least one image sensor having associated position and orientation information with respect to the three dimensional model, the background image comprising a single distribution background dynamically modeled from a time average of the real-time video imagery information; placing a surface that corresponds to the moving region in the three dimensional model, wherein placing the surface comprises casting a ray from an optical center, corresponding to the real-time video imagery information, to a bottom point of the moving region in an image plane in the three dimensional model, and determining a position, an orientation and a size of the surface based on the ray, a ground plane in the three dimensional model, and the moving region; projecting the real-time video imagery information onto the three dimensional model, including the surface, based on the position and orientation information; and visualizing the three dimensional model with the projected real-time video imagery; wherein identifying a region in motion in real time comprises subtracting the background image from the real-time video imagery information, identifying a foreground object in the subtracted real-time video imagery information, validating the foreground object by correlation matching between identified objects in neighboring image frames, and outputting the validated foreground object;

wherein identifying a foreground object comprises identifying the foreground object in the subtracted real-time video imagery information using a histogram-based threshold and a noise filter.

12. The machine-readable storage device of claim 11, wherein the surface comprises a two dimensional surface.

13. The machine-readable storage device of claim 11, further comprising tracking the position and orientation information of the at least one image sensor in the environment with respect to the three dimensional model in real-time.

14. The machine-readable storage device of claim 13, wherein obtaining a three dimensional model of a three dimensional environment comprises generating the three dimensional model of the three dimensional environment.

15. The machine-readable storage device of claim 11, wherein identifying a region in motion in real time further comprises estimating the background image by modeling the background image as a temporal pixel average of five recent image frames in the real-time video imagery information.

* * * * *

UNITED STATES PATENT AND TRADEMARK OFFICE
CERTIFICATE OF CORRECTION

PATENT NO. : 7,583,275 B2  Page 1 of 1
APPLICATION NO. : 10/676377
DATED : September 1, 2009
INVENTOR(S) : Ulrich Neumann et al.

It is certified that error appears in the above-identified patent and that said Letters Patent is hereby corrected as shown below:

IN THE SPECIFICATION:
Column 1, lines 20-27, delete

"The invention described herein was made in the performance of work under NSF ERC EEC-9529152 SA2921 by NSF (National Science Foundation) ARO-MURI (Army Research Office - Multidisciplinary University Research Initiative), pursuant to which the Government has certain rights to the invention, and is subject to the provisions of Public Law 96-517 (35 U.S.C. 202) in which the contractor has elected to retain title"

and insert

--This invention was made with government support under Contract No. NSF ERC EEC-9529152 awarded by the National Science Foundation and under Contract No. SA2921 awarded by the Army Research Office - Multidisciplinary University Research Initiative. The government has certain rights in the invention--;

IN THE CLAIMS:
Column 17, line 4 (Claim 1) delete "objects" and insert --object--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,583,275 B2
APPLICATION NO. : 10/676377
DATED : September 1, 2009
INVENTOR(S) : Neumann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 144 days.

Signed and Sealed this

Fourteenth Day of September, 2010

David J. Kappos
*Director of the United States Patent and Trademark Office*